United States Patent [19]

Sugden

[11] Patent Number: 5,723,858
[45] Date of Patent: Mar. 3, 1998

[54] POSITION ENCODER WITH FAULT INDICATOR

[75] Inventor: David Mark Sugden, Ilkley, United Kingdom

[73] Assignee: Switched Reluctance Drives, Ltd., Harrogate, United Kingdom

[21] Appl. No.: 847,401

[22] Filed: Apr. 24, 1997

Related U.S. Application Data

[63] Continuation of Ser. No. 472,959, Jun. 7, 1995, abandoned.

[30] Foreign Application Priority Data

Mar. 28, 1995 [GB] United Kingdom ............... 9506358

[51] Int. Cl.$^6$ .................................................... G01D 5/34
[52] U.S. Cl. ............................... 250/231.13; 250/231.16; 250/559.45
[58] Field of Search ..................... 250/231.13, 231.14, 250/231.15, 231.16, 231.17, 231.18, 237 G, 237 R, 214 PR, 559.1, 559.45

[56] References Cited

U.S. PATENT DOCUMENTS

| | | | |
|---|---|---|---|
| 4,507,590 | 3/1985 | Miyazakil | 318/254 |
| 4,600,835 | 7/1986 | Ishida et al. | 250/231.16 |
| 4,678,948 | 7/1987 | Schmitt | 250/237 G |
| 4,896,088 | 1/1990 | Jahns | 318/696 |
| 4,896,089 | 1/1990 | Kliman et al. | 318/701 |
| 5,128,536 | 7/1992 | Higashi | 250/231.16 |

FOREIGN PATENT DOCUMENTS

| | | |
|---|---|---|
| 0 378 351A2 | 1/1990 | European Pat. Off. |
| 0 378 351A3 | 1/1990 | European Pat. Off. |
| WO 94/01919 | 1/1994 | European Pat. Off. |
| WO 90/00325 | 1/1990 | WIPO |

OTHER PUBLICATIONS

Stephenson and Blake, *The Characteristics, Design and Applications of Switched Reluctance Motors and Drives*, (Jun. 1993, Nuremberg, Germany), pp. 1–67.

*Primary Examiner*—Que Le
*Attorney, Agent, or Firm*—Arnold, White & Durkee

[57] ABSTRACT

A failure detector for a position encoder which uses a plurality of position sensors. The failure detector receives position signals from the plurality of position sensors. The position signals represent the rotor position for a switched reluctance machine, and the position signals have allowable states and allowable output state sequences that occur if the position encoder is operating properly. If one or more of the plurality of sensors fail or the rotating element of the position encoder is damaged, an illegal state occurs in the position signals from the position sensors. The failure detector produces a failure signal upon the occurrence of an illegal state. In addition, the failure detector monitors the sequence of the output states and generates a failure when the output states change in a sequence that is not one of the allowed sequences. The machine controller can respond to the failure signal to stop machine operation or trigger an alternate positioning scheme.

30 Claims, 4 Drawing Sheets

5,723,858

1

POSITION ENCODER WITH FAULT INDICATOR

This application is a continuation of application Ser. No. 08/472,959, filed Jun. 7, 1995, now abandoned.

FIELD OF THE INVENTION

The present invention generally relates to a position encoder with a fault indicator. More particularly, the present invention relates to a position encoder with a fault indicator for use in a switched reluctance drive.

BACKGROUND OF THE INVENTION

In general, a reluctance machine can be operated as an electric motor in which torque is produced by the tendency of its movable part to move into a position where the reluctance of a magnetic circuit is minimized, i.e. the inductance of the exciting winding is maximized.

In one type of reluctance machine the energization of the phase windings occurs at a controlled frequency. These machines can be operated as a motor or a generator. They are generally referred to as synchronous reluctance motors. In a second type of reluctance machine, circuitry is provided for detecting the angular position of the rotor and energizing the phase windings as a function of the rotor's position. This second type of reluctance machine may also be a motor or a generator and such machines are generally known as switched reluctance machines. The present invention is generally applicable to switched reluctance machines, including switched reluctance machines operating as motors or generators.

FIG. 1 shows the principal components of a switched reluctance drive system 10 for a switched reluctance machine operating as a motor. The input DC power supply 11 can be either a battery or rectified and filtered AC mains. The DC voltage provided by the power supply 11 is switched across the phase windings of the motor 12 by a power converter 13 under the control of the electronic control unit 14. The switching must be correctly synchronized to the angle of rotation of the rotor for proper operation of the drive 10. As such, a rotor position detector 15 is typically employed to supply signals corresponding to the angular position of the rotor. The rotor position detector 15 may also be used to generate a speed feedback signal.

The rotor position detector 15 may take many forms. In some systems, the rotor position detector 15 can comprise a rotor position transducer that provides output signals that change state each time the rotor rotates to a position where a different switching arrangement of the devices in the power converter 13 is required. In other systems, the rotor position detector 15 can comprise a relative position encoder that provides a clock pulse (or similar signal) each time the rotor rotates through a preselected angle.

In systems where the rotor position detector 15 comprises a rotor position transducer, failure of the rotor position transducer circuitry to properly provide output signals representative of the angular position of the rotor can seriously degrade the performance or, in the worst case, render the motor inoperable. In some circumstances, a controller 14 attempting to control a machine based on faulty rotor position transducer outputs could potentially damage both the machine and the remainder of the control circuitry.

The importance of accurate signals from the rotor position detector 15 may be explained by reference to FIGS. 2 and 3. FIGS. 2 and 3 explain the switching of a reluctance machine operating as a motor.

2

FIG. 2 generally shows a rotor pole 20 approaching a stator pole 21 according to arrow 22. As illustrated in FIG. 2, a portion of a complete phase winding 23 is wound around the stator pole 21. As discussed above, when the portion of the phase winding 23 around stator pole 21 is energized, a force will be exerted on the rotor tending to pull rotor pole 20 into alignment with stator pole 21.

FIG. 3 generally shows the switching circuitry in power converter 13 that controls the energization of the portion of the phase winding 23 around stator pole 21. When power switching devices 31 and 32 are switched ON phase winding 23 is coupled to the source of DC power and the phase winding is energized.

In general, the phase winding is energized to effect the rotation of the rotor as follows: At a first angular position of the rotor (called the turn-ON angle), the controller 14 provides switching signals to turn ON both switching devices 31 and 32. When the switching devices 31 and 32 are ON the phase winding is coupled to the DC bus which causes an increasing magnetic flux to be established in the motor. It is this magnetic flux pulling on the rotor poles that produces the motor torque. As the magnetic flux in the machine increases, electric current flows from the DC supply provided by the DC bus through the switches 31 and 32 and through the phase winding 23. In some controllers, current feedback is employed and the magnitude of the phase current is controlled by chopping the current by switching one or both of switching devices 31 and/or 32 on and off rapidly.

In many systems, the phase winding remains connected to the DC bus lines (or connected with chopping if chopping is employed) until the rotor rotates such that it reaches what is referred to as the rotor "Freewheeling angle" When the rotor reaches an angular position corresponding to the Freewheeling angle (position 24 in FIG. 2) one of the switches, for example 31, is turned OFF. Consequently, the current flowing through the phase winding will continue to flow, but will now flow only through one of the switches (in this example 32) and through only one of the return diodes (in this example 34). During the freewheeling period there is little voltage differential across the phase winding, and the flux remains substantially constant. The motor system remains in this freewheeling condition until the rotor rotates to an angular position known as the "turn-OFF" angle (represented by position 25 in FIG. 2). When the rotor reaches the turn-OFF angle, both switches 31 and 32 are turned-OFF and the current in phase winding begins to flow through diodes 33 and 34. The diodes 33 and 34 then apply the DC voltage from the DC bus in the opposite sense, causing the magnetic flux in the machine (and therefore the phase current) to decrease.

The energization of the phase windings in a switched reluctance motor depends heavily on accurately detecting the angular position of the rotor. If the rotor position detector fails and the controller continues to energize the phase windings, dangerously high currents could build up in the motor, potentially damaging the motor and the controller. Moreover, when a drive system fails, it is often necessary to test various control and motor components to find the failed elements. It would be beneficial to have an indicator that specifically indicates that the failure of the drive system was the result of a rotor position detector failure so that unnecessary testing and debugging is not attempted. While some complicated rotor position detectors have some fault indicating circuits, such encoders are relatively expensive and require additional hardware for proper operation. Known position decoders do not provide a low cost, compact rotor position detector that provides an indication when the rotor position detector has failed.

It is an object of the invention to overcome the above described and other disadvantages of known position detectors and provide a relatively inexpensive rotor position detector that provides an indication when a fault has occurred without the need for complex or expensive additional circuitry.

SUMMARY OF THE INVENTION

The present invention extends to a rotor position detector that provides a signal indicating a failure of the position detector. In one embodiment of the present invention, the rotor position detector comprises a plurality of position sensors and a failure detector that receives position signals from the plurality of position sensors. The position signals represent the rotor position for a switched reluctance motor, and the position signals have allowable states that occur when the rotor position detector is operating properly. If one or more of the plurality of sensors fails, an illegal state occurs in the position signals from the position sensors. A similar illegal state can occur if the rotating element of the position detector is dislodged from its position, is damaged, or if part of the rotating element becomes detached. The failure detector detects these illegal states and produces a failure signal upon the occurrence of an illegal state. Accordingly, the motor controller can respond to the failure signal to stop motor operation or trigger an alternate positioning scheme.

In an alternate embodiment, the output signals from the position encoder define output states and the output states are such that there are allowable sequences of output states that occur when the position encoder is operating properly. In this embodiment, the sequence of the output states from the position encoder is monitored and an encoder failure signal is generated whenever an output sequence occurs that is not one of the allowable sequences.

BRIEF DESCRIPTION OF THE DRAWINGS

Other aspects and advantages of the present invention will become apparent upon reading the following detailed description of exemplary embodiments and upon reference to the drawings in which.

Similar reference characters indicate similar parts throughout the several views of the drawings.

DETAILED DESCRIPTION OF THE INVENTION

Illustrative embodiments of the invention are described below as they might be implemented using the failure detection circuitry of the present invention to effectively detect the failure of a position detector or a position encoder of a switched reluctance drive. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

The present invention involves a failure detector for a position encoder that uses a plurality of position sensors. The failure detector receives position signals from the plurality of position sensors. The position signals represent the rotor position of an electric machine (e.g., a switched reluctance machine), and the position signals have allowable states that occur if the position sensors are operating properly.

If one or more of the plurality of sensors fail, an illegal state occurs in the position signals from the position sensors. An illegal state will also occur if the rotating element of the position encoder is damaged (e.g., if it is dislodged from its position or loses a piece). The failure detector produces a failure signal upon the occurrence of an illegal state. Accordingly, the controller can respond to the failure signal to stop motor operation or trigger an alternate positioning scheme.

Figure 1:
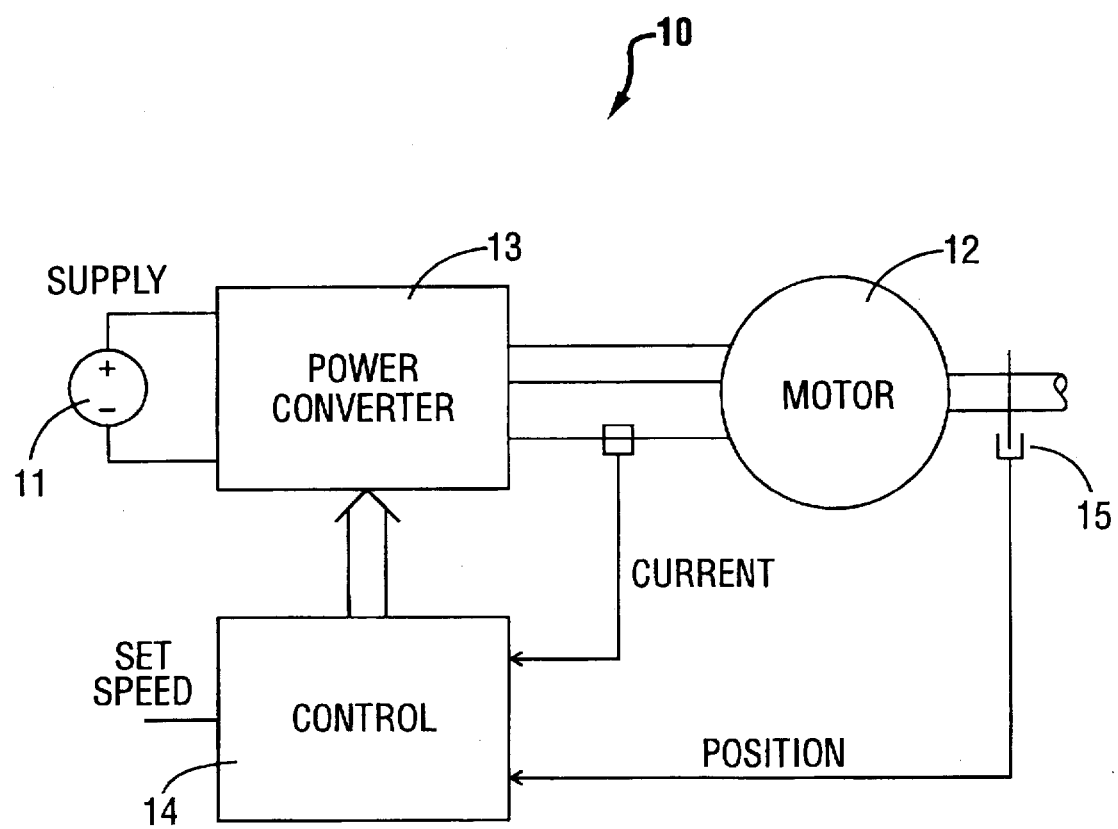
FIG. 1 shows the principal components of a switched reluctance drive system.
Figure 2:
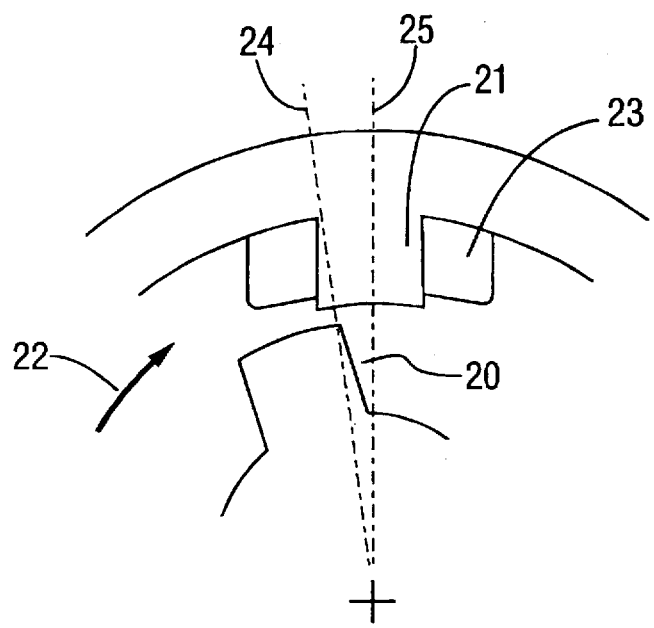
FIG. 2 shows a rotor pole approaching a stator pole and the commutation points for the portion of the phase winding associated with the stator pole.
Figure 3:
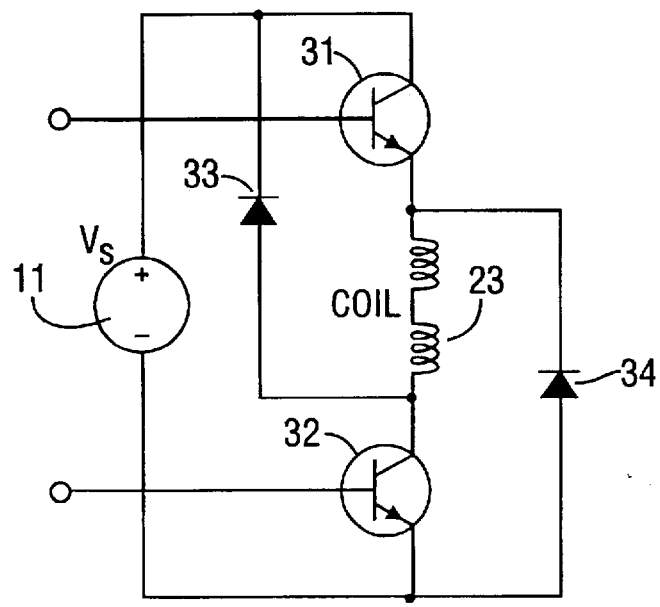
FIG. 3 generally shows the switching circuitry in a power converter that controls the energization of the portion of the phase winding associated with the stator pole of FIG. 2.
Figure 4:
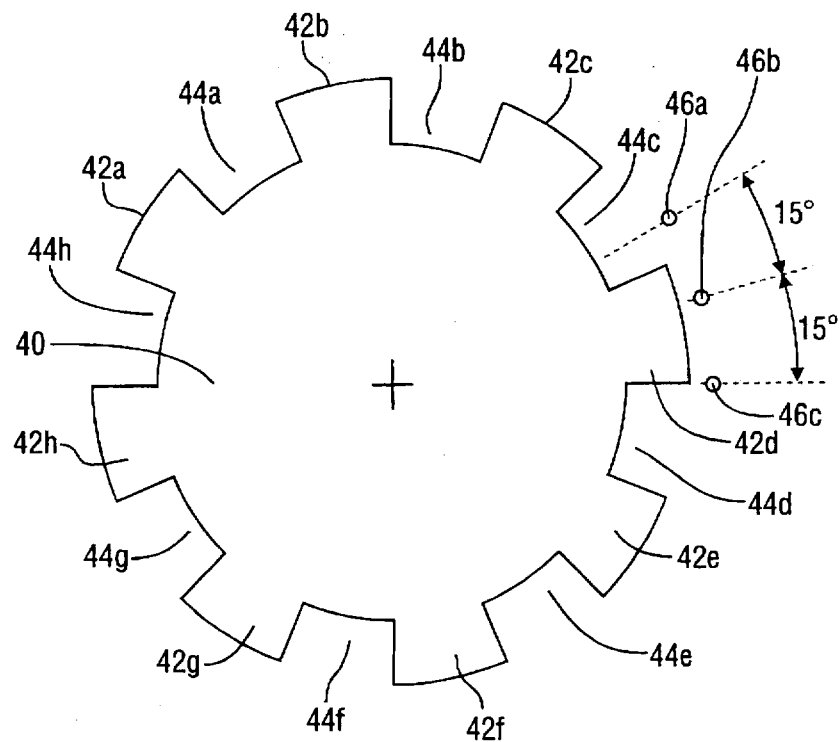
FIG. 4 shows a position encoder using a vane and three position sensors that can be utilized with one embodiment of the present invention.

FIG. 4 shows one type of position encoder that can be utilized with the failure detector circuit of the present invention. The position encoder includes rotatable element comprising a vane 40 shown with 8 equally spaced light interrupting parts 42a–h and 8 equally spaced light transmissive parts 44a–h. In this embodiment, the vane 40 is mounted on the rotor shaft of the machine. In this way, the vane 40 reflects the angular position of the rotor. The position encoder further includes 3 slotted optical sensors 46a–c, which are mounted 15 degrees apart on a stationary member.

The sensors 46a–c include a light source that provides a light beam that impinges upon a light detector when a light transmissive portion of the vane fills the sensor (i.e., when the sensor is near a space region of the vane). When the light from the light source impinges on the detector, the sensor 44 produces a digital output signal at a first logic level, e.g., logic 0. When a light inhibiting portion of vane 40 (i.e., one of portions 42a–h) fills one of sensors 46a–c (i.e., when the sensor is near a mark region of the vane), it will block the light and no light will impinge on the detector for that sensor. When there is no light impinging on the detector, the sensor will produce a digital output signal of a second logic level, e.g., logic 1. In general, the light transmissive portions of the vane that cause the sensors to produce logic 0 signals may be referred to as the "space" regions of the vane and the light inhibiting portions may be referred to as the "mark" regions of the vane.

In accordance with the teachings of the present invention, the sensors 46a–c are positioned such that the outputs from the sensors define an output state and there are certain output states of the sensors 46a–c that will never occur when the sensors are operating properly and the rotating vane is undamaged and properly positioned. For example, in the embodiment of FIG. 4, the angular span of the mark and space regions of the vane define an angular distance of 22.5°. As indicated in the figure, the angular distance between each of the sensors is 15° (less than the angular span of the mark and space regions) and the angular distance between the outermost sensors is 30° (greater than the angular extent of the mark and space regions).

Because of the relationship between the angular extent of the mark and space regions of the vane and the positioning of the sensors, there are certain sensor output states that cannot occur when the rotor position detector is operating properly. For example, in the embodiment of FIG. 4, the output states (or output patterns) from the sensors 46a–c when operating properly can be: 101, 001, 011, 010, 110 and 100. When operating properly, however, the outputs from the sensors can never be in the state or pattern 111 because both the mark and space regions of the vane have an angular spread less than the 30° angular distance between the outermost sensors 46a and 46c. In the same manner, the angular distance of the mark and space regions and the positioning of the sensors precludes an output state or pattern of 000 when the rotor position detector is operating properly.

In accordance with one embodiment of the present invention, rotor position defects, including failures of the sensors 46a–46c, are detected and indicated by monitoring the outputs from the sensors and producing a fault signal whenever either of the two illegal output states 111 or 000 occurs.

It should be noted that the use of vane 40 with light transmissive space regions and light inhibiting mark regions, and light detecting sensors 46a–c is exemplary only. The present invention is applicable generally to all forms of position detectors that use a plurality of sensors that have certain output states that will not occur during normal operation. For example, the present invention is applicable to position detectors utilizing a vane including magnetic mark regions and non-magnetic space regions where the sensors that detect the mark and space regions are Hall-effect devices. Similarly, the vane could comprise teeth of ferromagnetic material and the sensors could each be a form of reluctance sensor. Other means of deriving the digital signals include regions of capacitance or inductance that vary and a switchable sensor to detect the changes. Also, light reflectance variations instead of regions of varying light transmissivity could be used. The present invention is also applicable to position detectors using a number of sensors different from that discussed above in connection with FIG. 4.

In general, the present invention may be beneficially applied to position detectors that produce digital output position signals where only one bit of the output changes for each change in the state of the rotor. In other words, the present invention is particularly adapted to position detectors that produce position signals in a Gray code.

Further, the present invention is applicable to position detectors utilizing mark and space regions, mark to space ratios, and numbers of sensors different from that illustrated in FIG. 4.

It should be further noted that the present invention requires only that there be one or more illegal states that will not occur when the rotor position detector is operating properly. For example, if there are N sensors, each producing either a logic high or low signal, there must be less than $2^N$ allowable output states such that there is at least one illegal state. Occurrence of the illegal state indicates failure of one or more sensors on the rotating vane.

Figure 5:
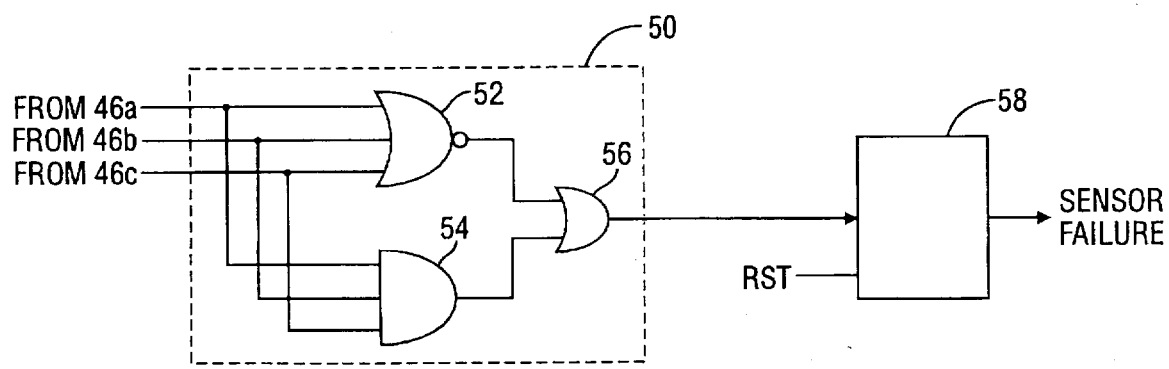
FIG. 5 shows failure detection circuitry according to one embodiment of the present invention.

FIG. 5 shows one embodiment of a failure detector circuit 50 in accordance with the present invention. The failure detector circuit 50 receives as its inputs the outputs from the three position sensors 46a–46c of FIG. 4. The outputs from the three sensors 46a–46c are provided as inputs to triple-input NOR gate 52 and triple-input AND gate 54. The output of triple-input NOR gate 52 will be logic high only when all three inputs to NOR gate 52 are all logic low. Accordingly, the output of NOR gate 52 will be high when the illegal output state 000 occurs. In a similar manner, the output of AND gate 54 will be logic high only when its three inputs are logic high. Accordingly, the output of AND gate 54 will be logic high whenever the illegal output state 111 occurs.

The outputs from NOR gate 52 and gate 54 are applied as inputs to OR gate 56 such that the output of OR gate 56 will be logic high whenever an illegal state occurs. Accordingly, a logic high output from OR gate 56 signals an error in one of the sensors 46a–c or a problem with the rotating vane 40. In the embodiment of FIG. 5, after the error signal at the output of OR gate 56 occurs, it is stored in fault latch 58, thereby maintaining the failure indication from the failure detector 50. Controller circuitry (not shown) can monitor the output of the failure detector 50 or the output of the fault latch 58 to determine when a failure has occurred. Upon the occurrence of a failure, the controller circuitry can stop operation of the drive, switch to an auxiliary positioning scheme or perform some type of fault detection.

Figure 6:
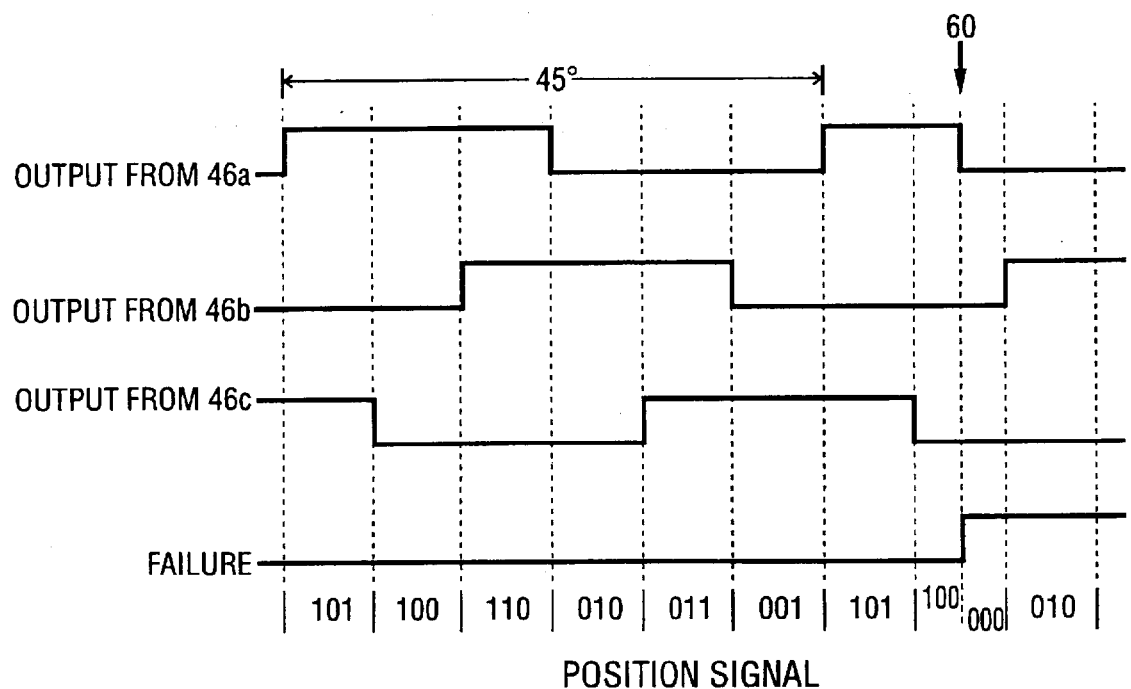
FIG. 6 shows a timing diagram for the position encoder of FIG. 4 detailing the operation of one embodiment of the present invention.

FIG. 6 generally illustrates the operation of the sensors 46a–c and the failure detector 50. In general, the top three waveforms of FIG. 6 illustrate exemplary outputs from sensors 46a–c as the vane 40 rotates past the sensors 46a–c during operation of the machine. The lower waveform of FIG. 6 represents the failure output which, in the example of FIG. 5, is the output of fault latch 58.

Referring to FIG. 6, for the normal operating states, the failure detector 50 produces a low logic sensor failure that indicates normal operation. If a position sensor 46 fails, for example sensor 46a, at point 60 and produces an illegal state (e.g., 000) the failure detector 50 will produce a logic high output indicating that a sensor failure has occurred. This high output will be latched into the fault latch 58 and the output of the fault latch 58 will remain high until the fault latch 58 is reset.

Although the embodiment of FIG. 5 utilizes discrete logic gates to detect the illegal states indicating a failure, embodiments are envisioned where the failure detector 50 comprises an integrated digital circuit chip, such as an Application Specific Integrated Circuit (ASIC) or a microprocessor, which determines whether the position signals 46a–c are indicating normal or faulty operation of the position sensors.

In an alternate embodiment of the present invention the sequence of the output signals provided by the position encoder are monitored and an encoder failure is indicated whenever an illegal sequence of output states occurs. For example, in the embodiment of FIG. 4, the output state 100 will never follow the output state 011 when the position encoder is operating properly. Similarly, the output state of 001 will not follow the output state of 011 when the encoder is operating properly. Thus, the occurrence of either of the output sequences 011–100 or 011–001 indicates an error or failure of the encoder. This method of error detection can detect an error in the encoder, even if each individual output state is a legal state.

This alternate embodiment may be implemented through the use of a look-up table that, for each output state, has stored within it the allowable adjacent (or next) state or states. When the encoder's output changes from a first output state to a second output state, the second output state is compared to the allowable next state(s) for the first output state. If the second output state does not match the allowable next output state(s) an encoder failure signal is generated indicating a position encoder error.

Figure 7:
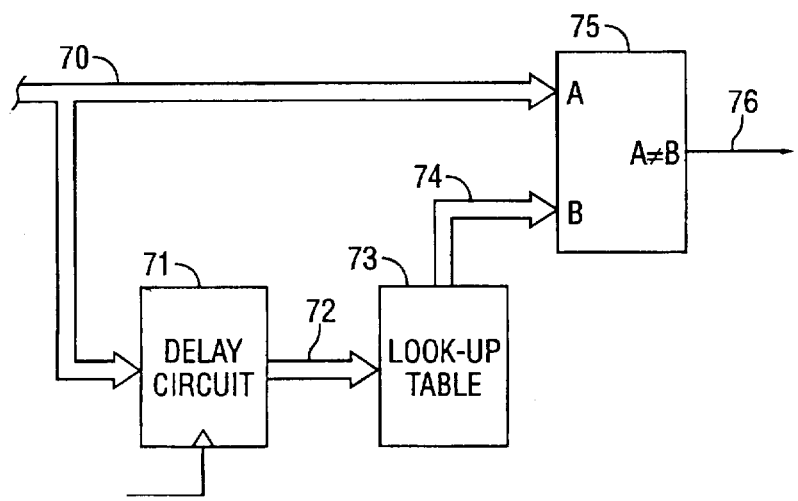
FIG. 7 generally illustrates an alternate failure detection circuit for detecting illegal output state sequences in accordance with the present invention.

FIG. 7 generally illustrates one example of an alternate failure detection circuit for detecting illegal output state sequences in accordance with the embodiment of the present invention. In FIG. 7, the current output state from the encoder appears across a data bus 70. Data bus 70 is coupled to the input of delay latch 71. Delay latch 71 is clocked by a circuit (not shown) that generates a clock pulse upon each change in the output state of the position encoder. The construction of a circuit for generating a clock pulse upon a change in the output state is within the level of ordinary skill in the art and is not discussed herein. The output of the delay latch 71 represents the delayed output state of the position encoder (i.e., the previous output state with respect to the current output state). The previous output state is provided as an input to look-up table 73 via bus 72.

Look-up table 73 has stored within it the allowable next output state (or states) for the previous output states. In response to a legal output state at its input, the look-up table 73 provides at its output the allowable next output state(s) for the previous output state. In the embodiment of FIG. 7, there is only one allowable next output state for each legal output state, although embodiments are envisioned wherein there are more than one allowable next output states.

The allowable next output state signal from look-up table 73 is provided via data bus 74 to one input of a digital comparator 75. The other input to digital comparator 75 is the current output state, which is provided by data bus 70. The digital comparator 75 compares the current output state with the allowable next output state for the previous output state and generates a fault signal at its output (bus 76) whenever the current output state does not match the allowable next state for the previous output state. The fault signal from comparator 75 may be handled by the motor system in the same manner discussed above for the error signal from OR gate 56 of FIG. 5. In some applications, it may be necessary to clock comparator 75 such that the comparison occurs only after the output of look-up table 73 has settled in response to the previous change in the output state.

As indicated above, in FIG. 7 there is only one allowable next state for each legal output state. In applications where there are more than one allowable next output states for each legal output state, additional comparators may be used. The outputs of the additional comparators may be combined via logic circuitry to produce an encoder failure signal when the current encoder output state does not match any of the allowable next output states for the previous state.

While FIG. 7 illustrates the use of discrete circuitry, the alternate embodiment may be implemented through the use of a properly programmed microprocessor, a microcontroller, an ASIC or the like. Moreover, although not shown in FIG. 7, the circuitry for detecting illegal output state sequences may be combined with the previously discussed circuitry for detecting illegal output states.

Although the invention has been described in terms of rotary machines, the skilled person will be aware that the same principles of operation can be applied to a linear position encoder to equal effect. For example, the skilled person will be aware that a reluctance machine (as with other types of electric machine) can be constructed as a linear motor. The moving member of a linear motor is referred to in the art as a rotor. The term "rotor" used herein is intended to embrace the moving member of a linear motor as well.

The principles of the present invention, which have been disclosed by way of the above examples and discussion, can be implemented using various circuit types and arrangements. The failure detector can be implemented using a variety of logic components, devices and configurations depending on the position encoder implementation and the desired performance characteristics. Moreover, the encoder and position sensor detector can be used with a reluctance machine having rotor or stator poles different in number from those illustrated herein. Further, the present invention is applicable to inverted machines (i.e., machines where the rotor rotates outside of the stator) and to any position encoder, such as position encoders for brushless DC motors or other commutated motors. Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A position encoder system that allows the failure of the position encoder to be detected, the system comprising:
   at least one movable member having a predefined width;
   a position encoder including three or more sensors positioned such that the distance between adjacent sensors is less than the predefined width and the distance between at least two of the sensors is greater than the predefined width, each sensor providing a digital output signal in response to the relationship of the movable member to the sensor where the digital output signals from the sensor define an output state, the sensors arranged such that a failure of the position encoder results in an illegal output state; and
   a failure detector electrically coupled to receive the output signals from the plurality of sensors, the failure detector signaling a failure whenever an illegal output state is detected.

2. The position encoder system of claim 1 wherein the position encoder comprises a vane coupled to the rotor of a machine, the vane defining a plurality of said movable members, the plurality of said movable members defining mark and space regions, and wherein the sensors provide an output signal of a first level when sensing a space region and an output signal of a second level when sensing a mark region.

3. The position encoder system of claim 2 wherein the output state when the output signals of all of the sensors are at the first level defines an illegal output state.

4. The position encoder system of claim 2 wherein the output state when the output signals of all of the sensors are at the second level defines an illegal output state.

5. The position encoder system of claim 2 wherein the machine is a switched reluctance machine.

6. The position encoder system of claim 1 wherein the sensors are optical sensors.

7. A position encoder system comprising: at least one movable member having a predefined width, a mounting member, at least three sensors mounted on the mounting member, the distance between adjacent sensors being less than the predefined width, each sensor providing a digital output signal, the digital output signals from the plurality of sensors defining a digital output state, wherein the plurality of sensors are arranged such that failure of one of the sensors produces a predefined digital output state.

8. The position encoder of claim 7 wherein the digital output signal provided by each sensor is either a logic high or a logic low and wherein the predefined digital output state corresponds to all sensor output signals being logic high.

9. The position encoder of claim 7 wherein the digital output signal provided by each sensor is either a logic high or a logic low and wherein the predefined digital output state corresponds to all sensor output signals being logic low.

10. The position encoder of claim 7 further comprising a failure detector circuit coupled to receive the digital output signals from the sensors, the failure detection circuit comparing the output state of the sensors to a predefined output state and signalling a fault whenever the predefined output state occurs.

11. A rotor position encoder system for a switched reluctance machine system, the system including a switched reluctance machine having a rotor, the rotor position encoder systems comprising:
- a vane coupled to the rotor of the switched reluctance machine, the vane defining mark and space regions, the mark regions having a predefined angular width;
- three or more sensors, each of the sensors configured to provide an output signal of a first logic level when sensing a space region of the vane and an output signal of a second logic level when sensing a mark region of the vane, wherein the distance between adjacent sensors is less than the predefined width and the distance between at least two of the sensors is greater than the predefined width; and
- a failure detector circuit coupled to receive the outputs from the sensors, the sensor failure detection circuit comparing the outputs from the sensors with a predefined output pattern and signaling a fault whenever the outputs from the sensors match the predefined output pattern.

12. The rotor position encoder system of claim 11 wherein the mark regions of the vane are defined by light inhibiting elements, wherein the space regions of the vane are defined by light transmissive regions, and wherein the sensors are optical sensors.

13. The rotor position encoder system of claim 11 wherein the predefined output pattern corresponds to the outputs from each of the sensors being at the first logic level.

14. The rotor position encoder of claim 11 wherein the first logic level is logic 0 and the second logic level is logic 1.

15. A position encoder comprising a member having a predefined width, at least three sensors responsive to the position of the member to provide a legal set of outputs indicative of a position of the member relative to the sensors when the encoder is functioning correctly and to provide an illegal set of digital outputs indicative of a failure of the encoder when a failure of one of the sensors has occurred, the distance between adjacent sensors being greater than one-half of the predefined width, the illegal set of outputs comprising a set of outputs that cannot occur when the position encoder is functioning properly, and a sensor output decoder arranged to receive the outputs from the sensors to produce signals indicative respectively of the legal and illegal status of the outputs from the sensors.

16. A method for detecting the failure of a position encoder in a switched reluctance drive using a position encoder, the position encoder including a vane defining a plurality of mark regions, each mark region having a predefined width and at least three position sensors, each position sensor providing a digital output signal in response to its relationship to one of the vanes, wherein the distance between adjacent sensors is less than the predefined width and the distance between at least two of the sensors is greater than the predefined width, the method including the steps of:
- receiving the digital output signals from the plurality of position sensors;
- determining if the digital output signals are in an illegal state that cannot occur if each of the position sensors is operating properly; and
- signaling a failure if said digital position signals are in the illegal state.

17. A position encoder system that allows the failure of the position encoder to be detected, the system comprising:
- a position encoder including a plurality of sensors, each sensor providing an output signal where the output signals from the sensors define an output state, the sensors arranged such that the output states change according to one or more allowable sequences over time when the position encoder is operating properly; and
- a sequence monitor electrically coupled to receive the output signals from the plurality of sensors, the sequence monitor comparing the sequences at which the output signals change and signalling a failure whenever the outputs of the sensors change over time according to a sequence different from the allowable sequences.

18. The position encoder system of claim 17 wherein the position encoder comprises a vane coupled to the rotor of a machine, the vane defining mark and space regions and wherein the plurality of sensors provide an output signal of a first level when sensing a space region and an output signal of a second level when sensing a mark region.

19. The position encoder system of claim 17 wherein the machine is a switched reluctance machine.

20. The position encoder system of claim 17 wherein the sensors are optical sensors.

21. A rotor position encoder system for a switched reluctance machine, the machine including a rotor, the position encoder systems comprising:
- a vane coupled to the rotor of the switched reluctance machine, the vane defining mark and space regions;
- a plurality of sensors, each of the sensors configured to provide an output signal such that the outputs from the sensors define an output state that changes according to one or more allowable sequences over time when the position encoder is properly operating;
- a failure detection circuit that monitors the sequences at which the outputs from the sensors change and indicates an encoder failure whenever the outputs from the sensors change over time according to a sequence that is not an allowable sequence.

22. The rotor position encoder system of claim 21 wherein the mark regions of the vane are defined by regions of one level of light transmissivity, wherein the space regions of the vane are defined by regions of another level of light transmissivity, and wherein the sensors are optical sensors.

23. A method for detecting the failure of a position encoder including a plurality of position encoder sensors, wherein the outputs from the position encoder sensors at a given time define a digital output state, the method including the steps of:

receiving position signals from the plurality of position sensors at a first time that defines a first output state;

receiving position signals from the plurality of position sensors at a second time, following the first time, that defines a second output state;

determining if the second output state is a state that cannot follow the first output state when the position encoder is operating properly; and signalling a failure if the second output state is a state that cannot follow the first output state when the position encoder is operating properly.

24. The method of claim 23 further comprising the steps of:

receiving the output signals from the plurality of position sensors;

determining if the output signals are in an illegal state that cannot occur if each of the position sensors is operating properly; and signalling a failure if said digital position signals are in the illegal state.

25. A position encoder system that allows the failure of the position encoder to be detected, the system comprising:

a position encoder including a plurality of sensors, each sensor providing, over time, a sequence of digital output signals where the output signals from the sensors define a sequence of output states, the sensors arranged such that a failure of the position encoder results in an illegal output state or an illegal output state sequence;

a first failure detection circuit coupled to receive the output signals from the plurality of sensors, the first failure detector signalling a failure whenever an illegal output state is detected; and a second failure detection circuit coupled to receive the output signals from the plurality of sensors, the second failure detection circuit monitoring the sequence of the output states over time and signalling a failure whenever an illegal output state sequence is detected.

26. The position encoder system of claim 25 wherein the position encoder comprises a vane coupled to the rotor of a machine, the vane defining mark and space regions, and wherein the plurality of sensors provide an output signal of a first level when sensing a space region and an output signal of a second level when sensing a mark region.

27. The position encoder system of claim 26 wherein the machine is a switched reluctance machine.

28. The position encoder system of claim 25 wherein the sensors are optical sensors.

29. A rotor position encoder system for a switched reluctance machine, the machine including a rotor, the position encoder systems comprising:

a vane coupled to the rotor of the switched reluctance machine, the vane defining mark and space regions;

a plurality of sensors, each of the sensors configured to provide an output signal of a first logic level when near a space region of the vane and an output signal of a second logic level when near a mark region of the vane, the output signals from the sensors defining, over time, a sequence of output states in response to rotation of the rotor; and a failure detector circuit coupled to receive the outputs from the sensors, the sensor failure detection circuit comparing the sequence of output states, over time, with a predefined sequence of output states and signalling a fault whenever the outputs from the sensors do not match the predefined sequence of output states.

30. The rotor position encoder of claim 29 wherein the failure detection circuit comprises a digital storing device within which the predefined sequence is stored.

* * * * *